Oct. 26, 1937.     H. M. BLACK     2,096,780
APPARATUS FOR FEEDING GLASS
Filed March 12, 1935     2 Sheets-Sheet 1
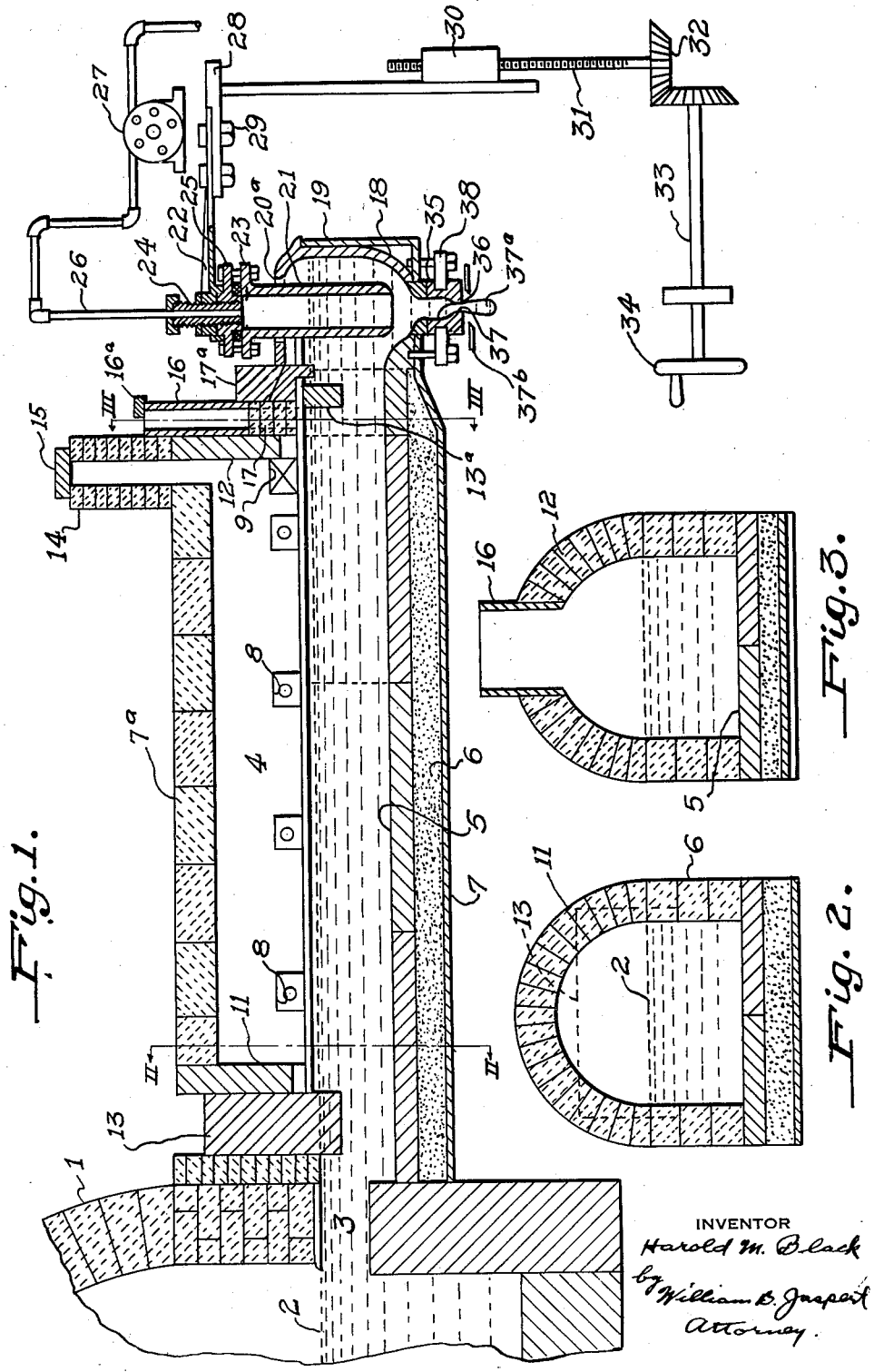
INVENTOR
Harold M. Black
by William B. Jaspert
Attorney.

Oct. 26, 1937.  H. M. BLACK  2,096,780
APPARATUS FOR FEEDING GLASS
Filed March 12, 1935   2 Sheets-Sheet 2
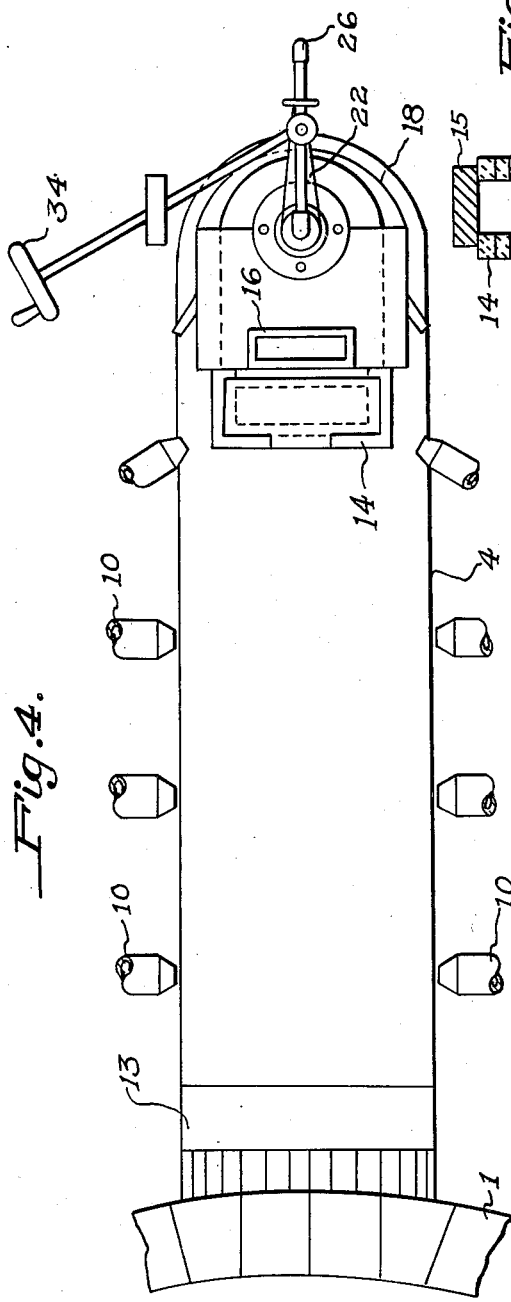
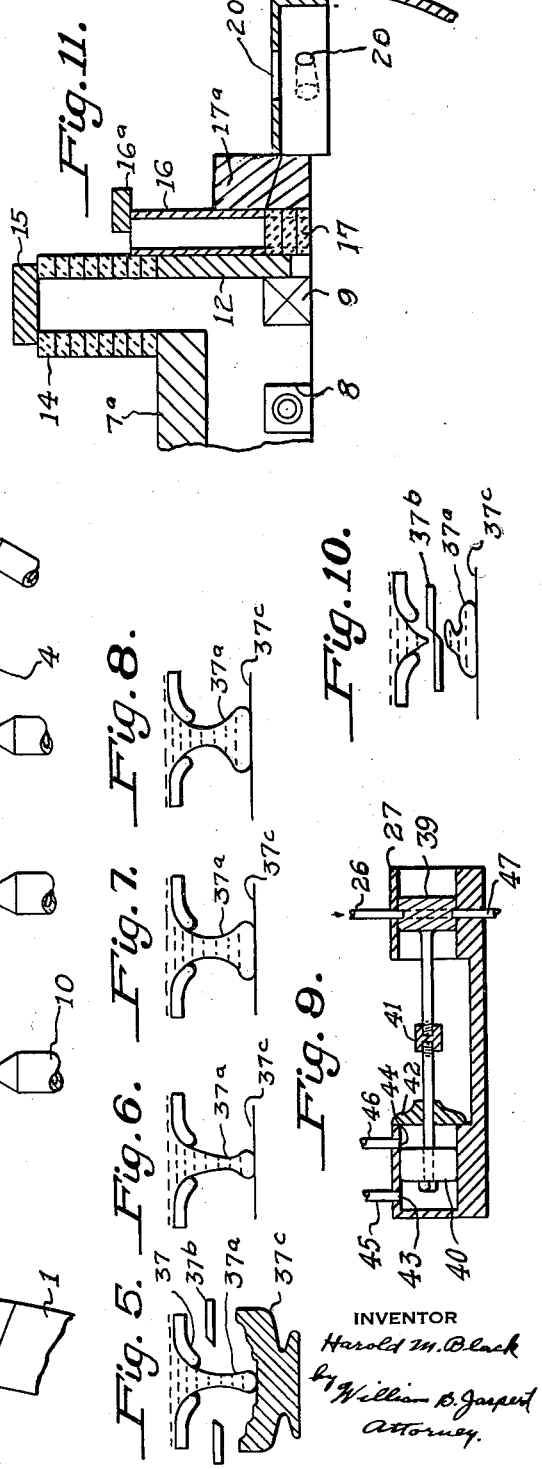
INVENTOR
Harold M. Black
by William B. Jaspert
Attorney.

Patented Oct. 26, 1937

2,096,780

UNITED STATES PATENT OFFICE 2,096,780

APPARATUS FOR FEEDING GLASS

Harold M. Black, Jeannette, Pa., assignor to McKee Glass Company, Jeannette, Pa., a corporation of Pennsylvania Application March 12, 1935, Serial No. 10,689

4 Claims. (Cl. 49—55)

This invention relates to apparatus and method for feeding mold charges from a mass of molten glass supplied from a continuous source, and the invention is particularly adapted for feeding glass by causing it to flow from a submerged orifice and interrupting such flow by the application of vacuum or negative pressure impulse to permit severing of the glass in intermittent timed relation, the timing being in synchronism with the movements of the mold supporting machine.

Another object of the invention is the provision of a flow spout provided with a relatively deep well above the feed orifice to partially control the head of glass effective above the orifice thereby regulating the quantity of glass delivered between successive retraction impulses.

A further object of the invention is the provision of means for controlling the temperature of the glass supplied to the flow spout both before and after the glass is delivered to such flow spout, such temperature control and the manner in which it is effected being of primary importance in the maintenance of suitable operating characteristics of the glass and to meet the varying conditions met with in the melting and refining of the glass.

These and other objects of the invention will become more apparent from a consideration of the accompanying drawings constituting a part hereof in which like reference characters designate like parts and in which:

Fig. 1 is a vertical longitudinal section of a portion of a glass tank, forehearth and flow spout embodying the principles of this invention.

Fig. 2 a cross-sectional view thereof taken along the line 2—2, Fig. 1;

Fig. 3 a cross-section taken on the line 3—3, Fig. 1;

Fig. 4 a plan view of Fig. 1;

Figs. 5, 6, 7, 8 and 10, diagrammatic illustrations of a method of feeding glass from a flow spout in accordance with the invention.

Fig. 9 a cross-sectional view of valve mechanism controlling the application of the vacuum impulses to the glass; and Fig. 11 a longitudinal cross-section of a portion of the flow spout with refractory tube removed.

With reference to Fig. 1 of the drawings, the structure therein illustrated comprises a melting tank or furnace generally designated by the reference numeral 1 for melting and refining glass, the numeral 2 designating the level of the glass in the furnace. 3 is an opening or flow passage leading therefrom to a forehearth structure generally designated by the numeral 4. The forehearth comprises a flat hearth 5 formed of refractory blocks having heat insulating material 6 therebetween and a cover plate 7 supporting the hearth structure. The hearth is provided with a straight side wall 6 and an arched roof 7a, the side walls being provided with burner ports 8 and a skimmer hole 9. As shown in Fig. 4, burners 10 are arranged in alignment with the ports 8 to inject a gaseous flame to the interior of the forehearth chamber. The ends of the arched roof 7a terminate at arched walls 11 and 12 as shown in Figs. 2 and 3 respectively. A relatively large skimmer block 13 is disposed behind arch 11 and as shown in dotted lines in Fig. 2 extends below the level of the glass in the forehearth. The sides of the block 13 extend beyond the inner surface of the side wall 6 as shown in Fig. 2 to prevent the passage of glass therearound. A skimmer block 13a is also provided between the forehearth chamber and the feed chamber.

A stack 14 is provided at the forward end of the forehearth adjacent the arch wall 12, the stack 14 having a damper 15 to control the passage of the waste gases or heat from the forehearth chamber to the atmosphere. A second stack 16 is provided on the opposite side of arch wall 12, the exhaust passage of which extends through the fire clay brick wall 17. A boot or flow spout herein designated by the reference numeral 18 forms an extension of the forehearth 4 and a silica brick arch 17a divides the top of the spout and wall 17. Arch 17a is removable for skimming, if necessary. The flow spout is of refractory material and is housed by metal plates 19. The top or cover 18a is provided with openings 20 parallel with the glass level, into which project a plurality of burners (not shown). The fuel does not burn on the surface of the glass as the burners are parallel to the surface of the pool. A refractory tube or sleeve 21 extends through opening 20a of spout cover 18a and is supported by bracket 22 to which it is bolted at its flange 23. A nipple 24 extends through bracket 22 and a clamping plate 25 to facilitate assembling and dismembering of the sleeve 21, and a conduit 26 extends into the nipple 24 and communicates with the hollow chamber of the tube 21 which will be hereinafter designated the impulse chamber, conduit 26 being connected to one side of a piston valve 27. The bracket 22 is bodily adjustable horizontally by a bolt and slot arrangement and up and down vertically by movement of a support 28 to which it is attached by bolts 29, the support having an integral screw thread nut 30 interacting with a screw shaft 31 which, through miter gears 32, is rotated by a shaft 33 having a hand wheel 34 at one end thereof.

The lower portion of the flow spout 18 is provided with clay rings 35 shaped to form a relatively deep well 36 beneath the refractory tube 21, the lower end 37 of the well or ring being constricted to form the feeding orifice for feeding mold charges 37a. The refractory member 35 is secured in place beneath the flow spout 18 by clamps 38 which are bolted to the metal plates 19, and the usual shear blades 37b are operative below the orifice to sever the gobs 37a. With reference to Fig. 9 of the drawings, the source of vacuum communicated to the hollow interior of the refractory tube 21 is controlled by a piston valve 39 which is actuated by a piston 40 to which it is coupled at 41. Piston 40 is operative in a cylinder 42 having ports 43 and 44 leading to a source of fluid pressure that is supplied through conduits 45 and 46. Cylinder 27 is connected to the pipe line 26 of the refractory tube 21 and also to a conduit 47 leading to a source of vacuum or negative pressure. Piston 39 is provided with an annular groove adapted to register with the ports of conduits 26 and 47 to establish communication therebetween. Application of fluid pressure through conduits 45 and 46 is controlled by a valve, not shown, which is actuated by movement of a cam to admit air to cylinder 42. The proper timing of the admission of air to cylinder 42 is brought about by a conventional timing mechanism that coordinates the movement of the forming machine and feeding apparatus.

The feeding of a charge of glass 37a to a mold is diagrammatically shown in Figs. 5 to 8 and 10 of the drawings, the numeral 37c designating the mold or mold surface.

The operation of the above described feeding apparatus is briefly as follows:

Glass is supplied from tank 1 through passage 3 to the forehearth 4, and is brought to normal working temperature by regulation of the burners 10 and damper 15 on stack 14. The conditioned glass flows into the spout 18 where its temperature can be further controlled by regulation of burners 17a and the stack 16. Skimmer block 13a prevents surface glass from entering the spout and similarly the skimmer block 13 prevents surface glass from entering the forehearth. The foreign particles accumulated behind the skimmer block 13a are removed through the skimmer hole 9. The glass 37a from the spout 18 flows downwardly and out of the feed orifice 37 by action of gravity. When a predetermined quantity of glass is thus extruded by gravity and the head pressure of the glass above the feed orifice, shear blades 37b will sever the suspended portion 37a causing it to drop in a mold arranged to be directly beneath the feed orifice 37.

Prior to the instance of severing, the chamber of the refractory tube 21 is evacuated through pipe line 26 to retract the glass in the feed orifice, causing it to neck or contract in the plane of severance so that the shear blades 37b cut through the constricted portion of the mold charge 37a. As explained in connection with the description of the valve mechanism in Fig. 9, the application of the vacuum or suction impulse to the glass is timed in synchronism with the mold machine, and also the severing blades 37b. When a mold is charged, it will be replaced by an empty mold below the feed orifice and the vacuum in the refractory cylinder 21 is broken to again permit the glass to flow from the well 36 through the feed orifice. By operating the hand wheel 34, the bracket 22 supporting the sleeve 21 is vertically adjusted to vary the position of the bottom of sleeve 21 relative to the flow spout, this adjustment being convenient to control the quantity of glass fed from the feed orifice and also to maintain the quantity constant when the quality of the glass in the flow spout may vary due to temperature changes of the glass or other operating conditions initiated in the melting tank 1. Sleeve 21 is also adjusted if the speed or rate of feeding is changed.

It has been found that by moving the sleeve 21 a very small fraction of an inch, such as 0.010" or 0.015", excellent control of the weight of the mold charge can be obtained through a wide range of temperature changes of the glass. However, to reduce the necessity for such adjustment to a minimum, the quality of the glass is controlled by manipulation of the dampers 15 and 16a and regulation of the forehearth burners 10 and the burners in openings 20 of the flow spout cover 18a. The weight and diameter of the charge 37a is primarily controlled by the diameter of the orifice 37 and different sizes of orifice rings 35 are mounted on the spout 18 for different weights of charges. The temperature in the rear combustion chamber that is in the forehearth 4 may be controlled by the front stack 16 or rear stack 14 as desired. However, stack 14 is intended to control the forehearth chamber 4 and stack 16 the flow spout. The front stack 16 is small and may be left uncovered while the rear stack may be employed to cool the rear compartment or both the front and rear compartments at the same time. By closing the front stack with a refractory brick or the like and opening the rear stack, a sustaining temperature may be maintained in front of the tube 21 while simultaneously cooling the forehearth chamber 4, by causing the flame or products of combustion from the front burners 17a to travel forward and then above the skimmer block 13a to the rear stack 14. This causes the flame to be applied a minimum distance from the surface of the glass when travelling from the spout to the forehearth chamber while it causes the flame from burner ports 8 of the forehearth chamber to be drawn away from the glass in the direction of the stack 14. By closing off the stack 14 as shown in Fig. 1, the heat will surround the tube and will be applied to the surface of the glass in the front and back of the front stack 16. By adjustment of the burners 17a a more intense heat may be maintained in the front compartment while less heat is used in the rear compartment or forehearth chamber. The skimming arrangement 13a and skimmer hole 9 permits removal of the collected particles without great interference with temperature regulation of the glass.

The deep well 36 above the feed orifice prevents the formation of air bubbles in the extruded glass as no air will be drawn into the spout which might occur if the said orifice were provided directly in the bottom of the spout 18 and the depth of the well further increases the head of the glass effective on the glass in the feed orifice 37 to maintain a cylindrical contour of the charge.

The shape of the mold charge 37a is largely governed by the distance of the mold from the orifice ring 37. If the mold is spaced too far from the orifice, the charge will string out and overlap in the mold leaving lap marks in the finished ware. By supporting the bottom of charge 31a on the receiving surface of the mold 31c the charge will swell as shown in Figs. 7 and 8 and when severed will be centered in the mold and be free of lap marks.

The proper spacing of the mold and feed ring is obtained by vertical adjustment of the mold to produce the desired weight and shape of mold charge.

It will be evident from the foregoing description of this invention that glass feeding apparatus constructed in accordance therewith provides flexible temperature regulation which is of great importance in the method of feeding glass by gravity and head pressure only, and that by the employment of a deep well beneath the flow spout and micrometric adjustment of the refractory sleeve 21, the weight of the segregated portions or mold charges can be uniformly maintained.

Although one embodiment of the invention has been herein illustrated and described it will be obvious to those skilled in the art that various modifications may be made in the details of construction without departing from the principles herein set forth.

I claim:

1. Apparatus for feeding glass comprising a melting tank, a forehearth structure having a feed chamber at one end thereof, an arch wall between the forehearth chamber and tank and an arch wall between the forehearth chamber and said feed chamber, a skimmer block extending the entire width of the forehearth above the level of the glass adjacent said first named arch wall, said block extending into the side wall of the forehearth to prevent the passage of glass therearound and a skimmer block adjacent the second named arch wall, a waste gas stack at the front end of the forehearth and another stack at the rear end of the feed chamber adjacent the first named stack, dampers controlling the waste gas passages of said stacks, burners in the forehearth chamber and burners for the feed chamber, said feed chamber having a submerged feed orifice and having a refractory tube extending below the level of the glass, means for adjusting the tube vertically relative to the feed orifice, and means for regulating the application of the heating medium to or away from the surface of the glass in the forehearth and feed chamber and to the front and rear portion of the latter.

2. Apparatus for feeding glass comprising an enclosed forehearth for supporting molten glass open at one end for receiving the glass from a source of supply, a feeding well of constricted cross-sectional area and substantial depth attached below the front end of said forehearth open to the interior thereof and having a feed orifice at the bottom of the well, a refractory tube suspended in the feed chamber open at its lower end and closed at the top, said refractory tube being mounted on a movable support, means for adjusting the vertical and lateral position of said support to change the distance of the end of the tube relative the well of the spout, and means independent of said heating means for controlling the application of heat to different portions of the glass in said chamber.

3. Apparatus for feeding glass comprising an enclosed forehearth for supporting molten glass, communicating at one end with a source of supply and having a well at its closed end, said well having a submerged feeding orifice at the bottom thereof, a feed chamber extending from said orifice upward a substantial distance into said well and terminating in a relatively wide bowl-shaped mouth, a refractory tube suspended in the said chamber, open at its lower end and closed at the top, said refractory tube being mounted on a movable support, means for adjusting the vertical and lateral position of said support to change the location of the mouth of the tube relative to the wide mouth of the well, and means for controlling the thermal properties of the glass passing to and in said well.

4. Apparatus for feeding glass comprising an enclosed forehearth for supporting molten glass, communicating at one end with a source of supply and having a well at its closed end, said well having a curved wide-mouth terminating in a relatively long and narrow feed chamber, with a submerged feeding orifice at the bottom, a refractory tube suspended in the said chamber, open at its lower end and closed at the top, the interior of said tube constituting an impulse chamber with said feed chamber, said tube being mounted on a movable support, means for adjusting the vertical position of said support to change the location of the mouth of the tube relative to the wide mouth of said well, and means for controlling the thermal properties of the glass passing to and in said well.

HAROLD M. BLACK.